No. 667,195. Patented Feb. 5, 1901.
T. V. DAVIS.
TELEPHONE SWITCHBOARD CONNECTION.
(Application filed Apr. 28, 1900.)
(No Model.)

Witnesses.
Edward T. Wray.
Homer L. Krafft

Inventor.
Thomas Vivian Davis
by Parker & Carter
his Atty's

UNITED STATES PATENT OFFICE.

THOMAS VIVIAN DAVIS, OF CHICAGO, ILLINOIS.

TELEPHONE-SWITCHBOARD CONNECTION.

SPECIFICATION forming part of Letters Patent No. 667,195, dated February 5, 1901.

Application filed April 28, 1900. Serial No. 14,711. (No model.)

*To all whom it may concern:*

Be it known that I, THOMAS VIVIAN DAVIS, a citizen of the United States, residing at Chicago, in the county of Cook and State of Illinois, have invented a certain new and useful Improvement in Telephone-Switchboard Connections, of which the following is a specification.

My invention relates to connections for telephone-switchboards and the like, and has for its object to produce a new and improved device for this purpose.

My invention is illustrated in the accompanying drawings, wherein—

Figure 1:
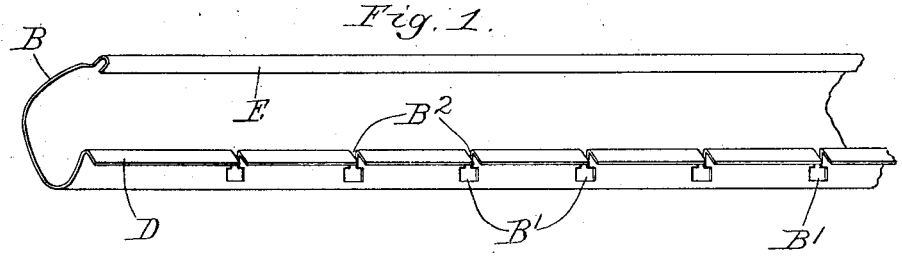
Figure 2:
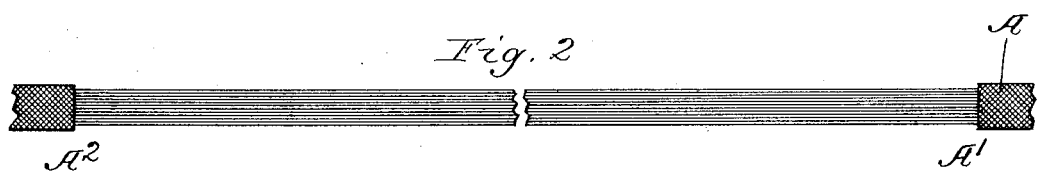
Figure 3:
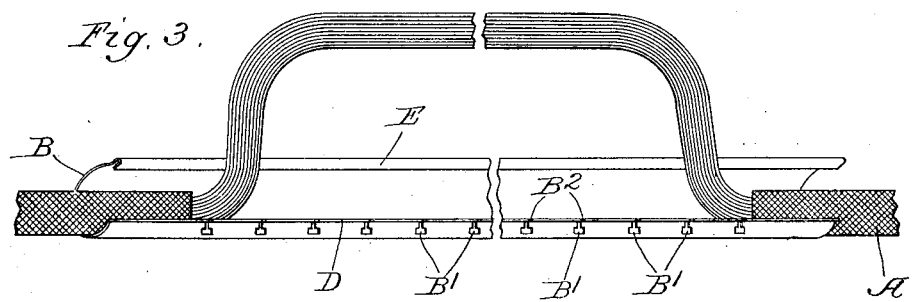
Figure 4:
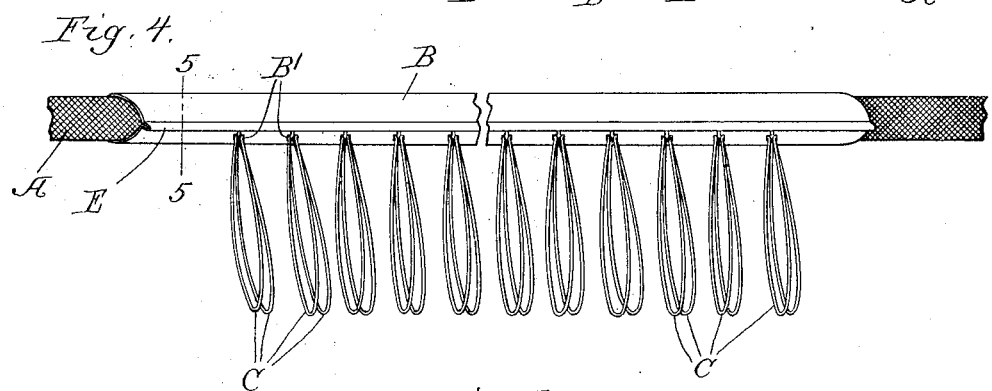
Figure 5:
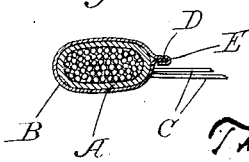

Figure 1 is a view of one form of device used in forming the connections. Fig. 2 is a view of a cable of conductors, showing the outside insulating-covering removed for a portion of the length of the cable. Fig. 3 is a view showing the cable of Fig. 2 in position in the device shown in Fig. 1. Fig. 4 is a view showing the complete connection. Fig. 5 is a section on line 5 5, Fig. 4.

Like letters refer to like parts throughout the several figures.

My invention is particularly adapted to be used where a series of electrical connections are to be taken from a cable at one or more points and is applicable to all devices where connections are taken from cables or from a series of conductors bunched together. In telephone-switchboards, for example, it is customary to run a cable along the switchboard and take off a series of connections to the jacks at different points. The present method of doing this is expensive and unsatisfactory in many particulars, and one of the objects of my invention is to remedy the evils ordinarily present and produce a satisfactory, efficient, and cheap construction for this purpose. For example, in the present method of making these connections from the cable it is necessary to shape the conductors so as to form the connections. Some suitable means must then be provided for rendering the points where the conductors project from the cable permanent and stationary, so that said conductors will project at a fixed point and be suitably spaced. It is then necessary to bring the portions of the conductors which are not used as these connections into their original relation and bind them in position. The ends of the insulating-covering must then be wrapped, so as to protect said ends and hold them in proper position. It is then necessary to provide a suitable insulating and protecting covering for the exposed portion of the cable. Heretofore it has been the practice to provide a forming device for forming or shaping the connections and then to fix the connections by means of tape or cord or the like and then to bind the several conductors in position by means of cords, the insulation being obtained by applying paraffin or other insulating or protecting material to the exposed conductor. This method consumes much time, is expensive because of the material used, and the result obtained is not satisfactory.

In carrying out my invention when a cable is used the outside covering or insulating material is removed or stripped from the cable at the points where the connections are to be made. The length of the stripped portion will of course depend upon the conditions and the number of connections to be made. I have shown in Fig. 2 a cable A, having the insulating material removed between the points $A'$ and $A^2$, said points $A'$ and $A^2$ representing the ends of the insulating material remaining. A suitable casing B is provided, into which the stripped or exposed portion of the cable is placed. This casing may be of any desired material suitable for the purpose. As herein illustrated, the casing is adapted to be opened and closed and is provided at one edge with a series of indentations or slots $B'$, which communicate with the edge of the casing. These slots may be of any desired form; but I prefer to make them larger at the bottom end, the slots communicating with the edge of the casing by means of the narrower portions or necks $B^2$. These slots receive and hold the cable connections and are suitably spaced along the edge of the casing, the spacing depending upon the distance apart it is desired to have the connections running from the cable. In forming the connection the casing is preferably open, as shown in Fig. 1, and the insulating material of the cable removed at the desired point, as shown in Fig. 2. The two ends $A'$ and $A^2$ of the insulating material of the cable are then moved toward each other, so as to loop the exposd part of the cable, and the insulation ends are then placed in the ends of the casing, as shown in Fig. 3. The cable is then held in this position by any desired means, such as a suitable clamp or the like, and the conductors C, which are to form the connections, are pulled down into the slots B', so as to project therefrom, as shown in Fig. 4. The slack in the cable is taken up by pulling out these conductors at the different points, so that the cable will be small enough to be contained within the casing. The exposed part of the cable will thus be reduced to substantially the same size it had in Fig. 2, the only difference being that it will be shorter and will have a series of conductors projecting therefrom through the slots in the casing. The casing is then closed and some suitable means is provided for holding its edges together. Any suitable arrangement for this purpose may be used, and, as herein shown, the casing is provided with interlocking edges D and E. These interlocking edges are preferably formed so that when the upper edge of the casing is pushed down far enough the edge E will engage the edge D and slide over said edge, so as to interlock with it, as shown in Fig. 5, thus holding the casing in a closed position.

It will thus be seen that by means of my construction much time and expense can be saved. The insulating or protecting casing obviates the use of a separate forming device, fixes the points at which the conductors project from the cable after the connections have been formed, binds the parts of the conductors not used as the connections together in their original relation, avoids the necessity of wrapping the cable ends and covering the exposed part of the cable with paraffin or other insulating material, and saves the time necessary to perform these several operations. When the casing is closed, a suitable protecting-covering is provided and a satisfactory, cheap, and durable construction is obtained. This casing is preferably made of some material that will permit it to be opened and closed, such as wood fiber or the like, and may be made up of sheets of material and shaped or given any desired form before the cable is placed in position. The conductors C may then be cut at the looped ends, so that the desired connections can be made.

I have described in detail a particular construction embodying my invention; but it is of course evident that this construction can be varied in many particulars without in any manner departing from the spirit of my invention. I therefore do not limit myself to the construction herein shown and described.

I claim—

1. A device for cable connections, comprising a casing with a series of slots or indentations along one edge to receive and hold the connections leading from the cable, and means associated with said casing for holding the edges together when the conductors are in place.

2. A device for cable connections, comprising a casing with a series of indentations or slots along one edge to receive and hold the connections leading from the cable, said casing provided with interlocking edges which interlock when brought together, so as to hold the casing in a closed position.

3. The combination with a cable of a casing adapted to surround said cable for a portion of its length, having a series of slots or indentations along the edge of said casing, conductors looped from said cable and received in said slots or indentations so as to be held in a fixed relation to each other, and means for holding the edges of said casing together when the conductors are in said slots.

4. A device for cable connections, comprising a protecting-casing, having a series of slots along one edge thereof for receiving the conductors from the cable and communicating with said edge, the slots being smallest at the points where they communicate with said edge, and a holding device for holding the edges of the casing together.

THOMAS VIVIAN DAVIS.

Witnesses:
  DONALD M. CARTER,
  HOMER L. KRAFT.